May 16, 1961
C. A. JOHNSTONE
2,984,157
MISSILE LAUNCHING SYSTEMS
Filed Sept. 29, 1950
8 Sheets-Sheet 1
Fig.1
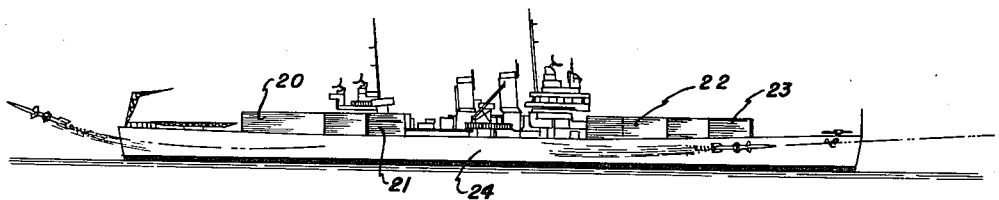
Fig.2
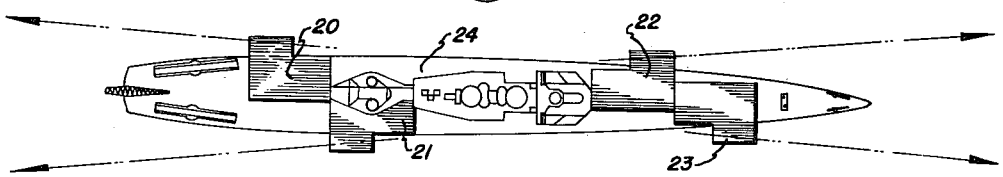
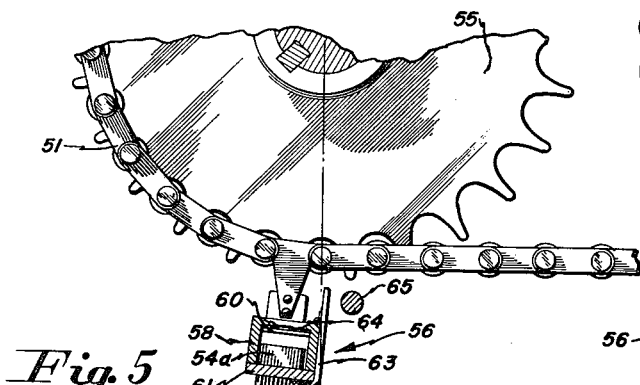
Fig.5
Fig.4
CHARLES A. JOHNSTONE
INVENTOR
BY
ATTORNEYS May 16, 1961 C. A. JOHNSTONE 2,984,157
MISSILE LAUNCHING SYSTEMS
Filed Sept. 29, 1950 8 Sheets-Sheet 2
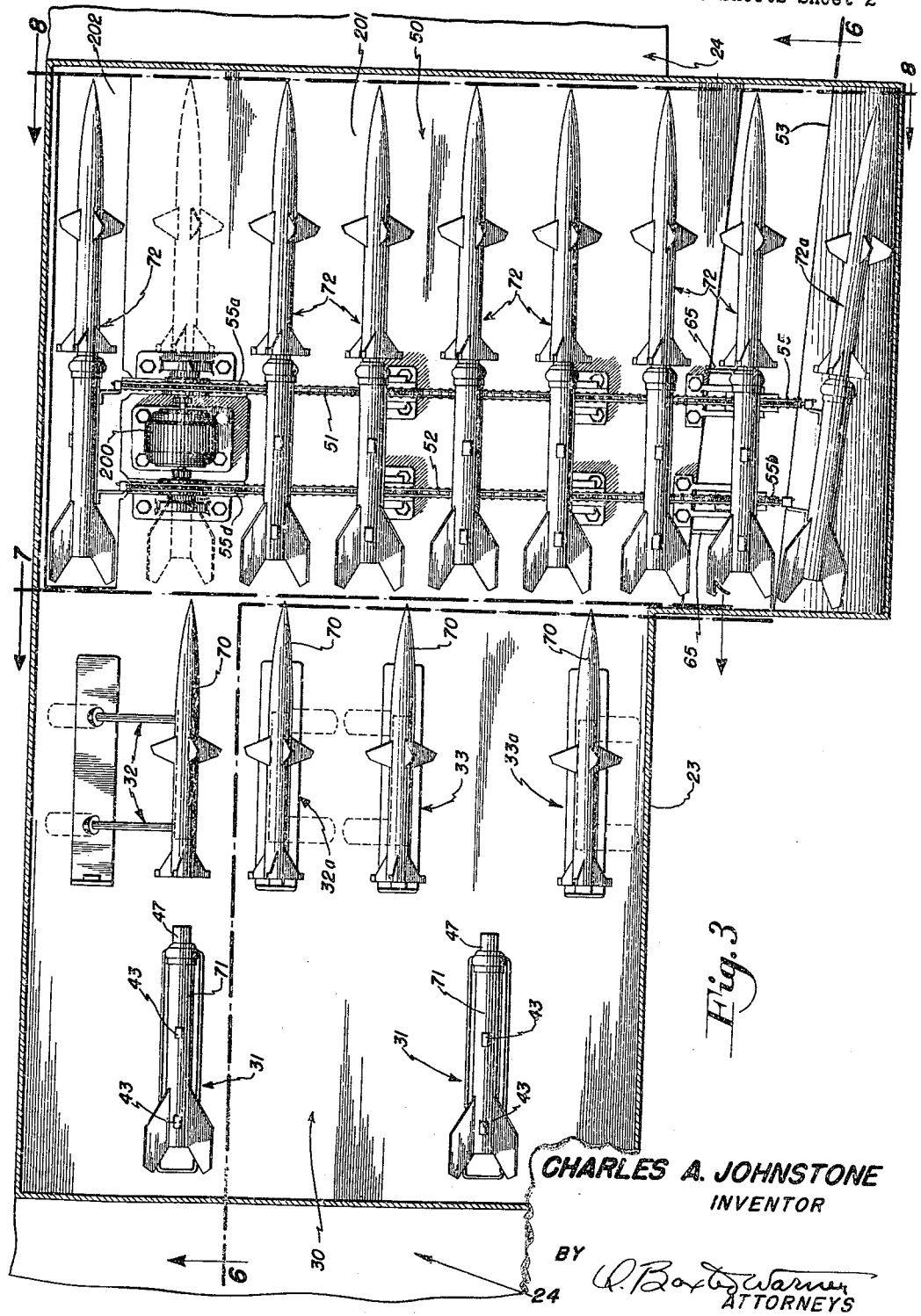

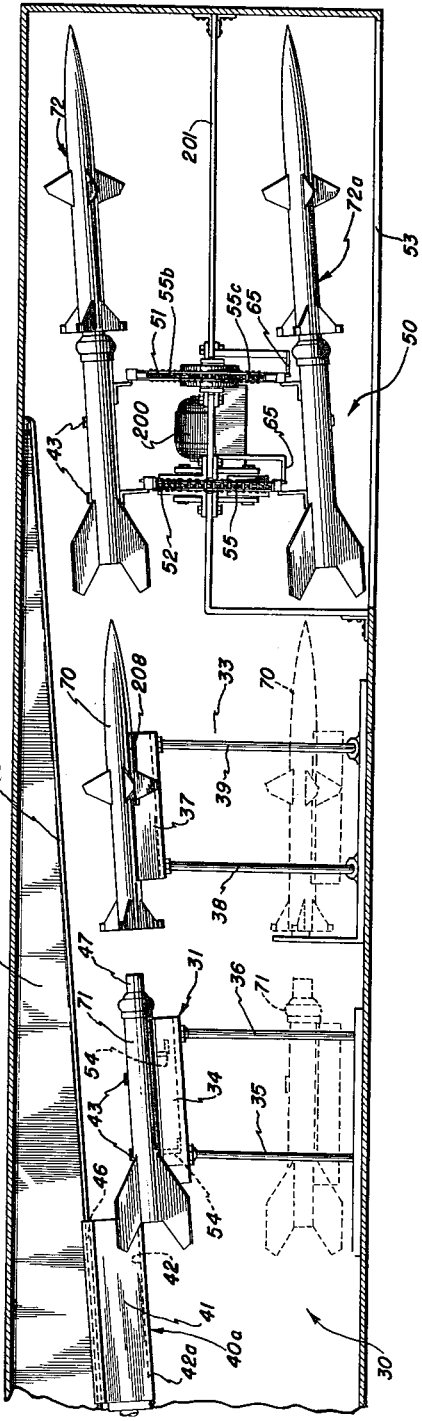
May 16, 1961 C. A. JOHNSTONE 2,984,157
MISSILE LAUNCHING SYSTEMS
Filed Sept. 29, 1950 8 Sheets-Sheet 3
CHARLES A. JOHNSTONE
INVENTOR.
BY
*R. Baxter Warren*
ATTORNEYS May 16, 1961 C. A. JOHNSTONE 2,984,157
MISSILE LAUNCHING SYSTEMS
Filed Sept. 29, 1950 8 Sheets-Sheet 4
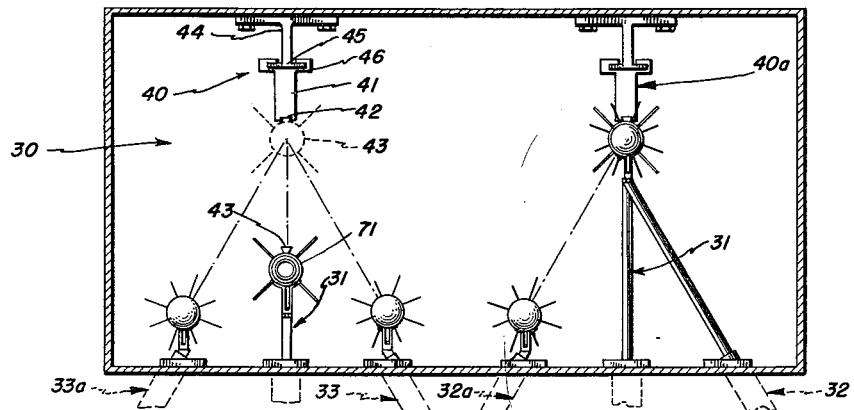
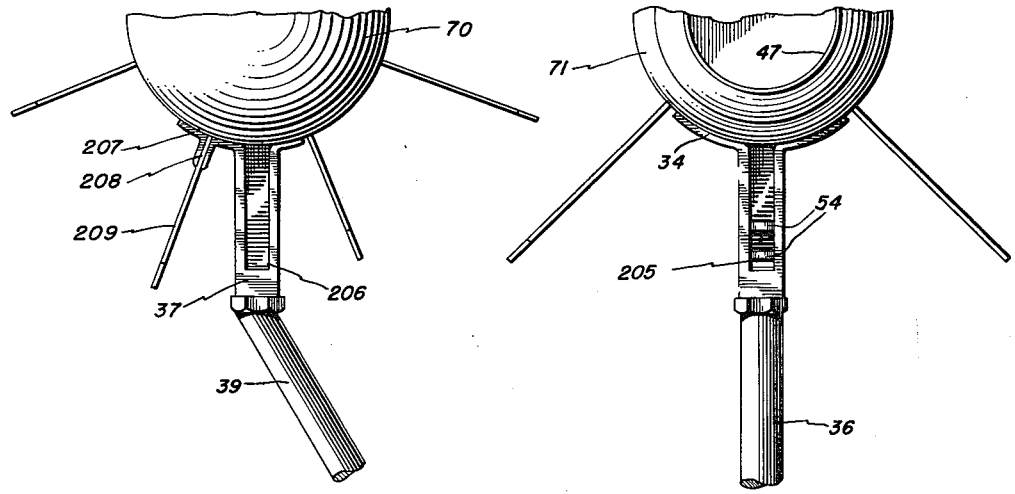
CHARLES A. JOHNSTONE
INVENTOR.
BY
*Q. Baxter Warner*
ATTORNEYS May 16, 1961  C. A. JOHNSTONE  2,984,157
MISSILE LAUNCHING SYSTEMS
Filed Sept. 29, 1950  8 Sheets-Sheet 5
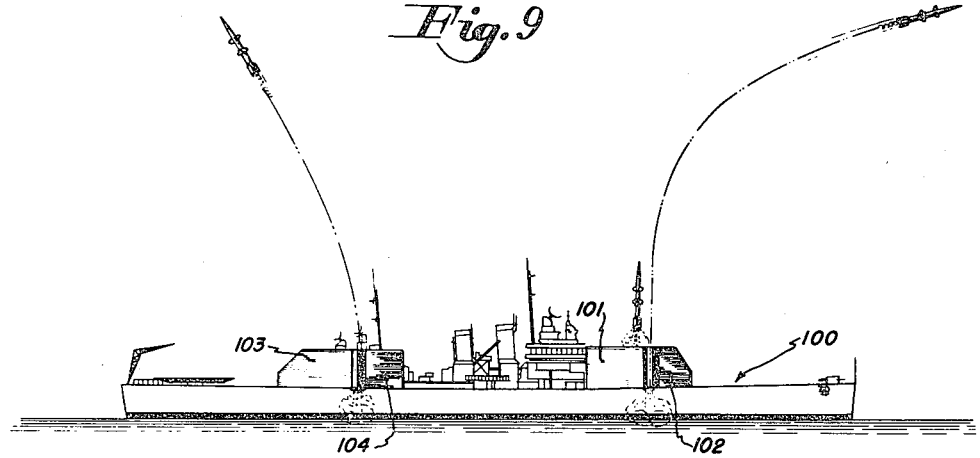
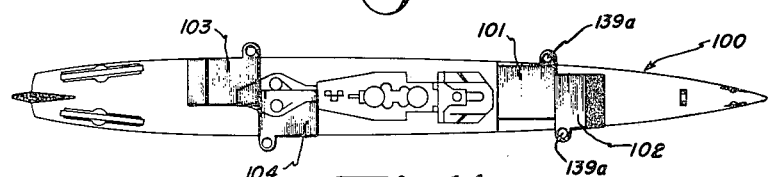
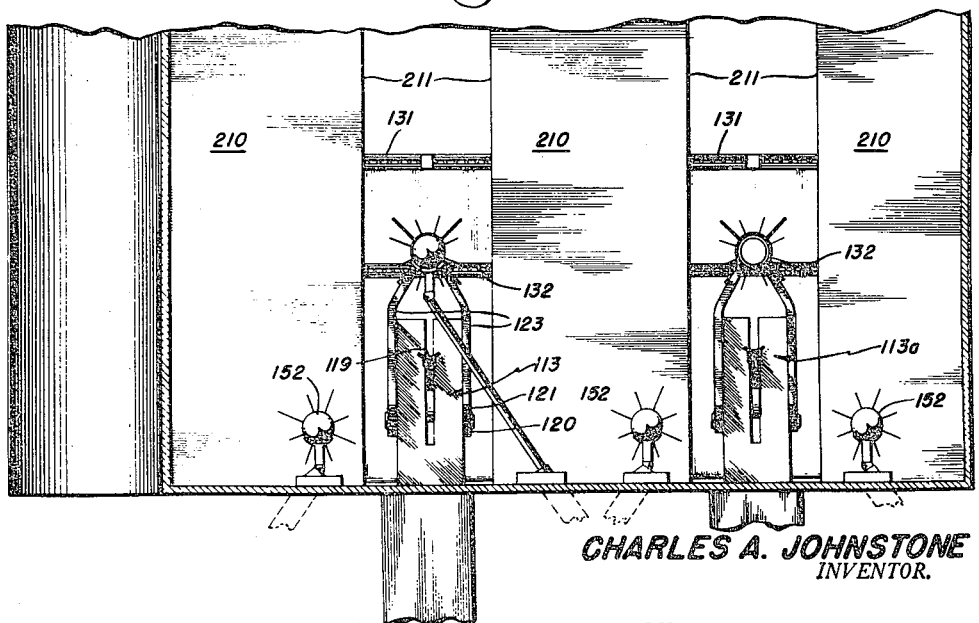
CHARLES A. JOHNSTONE
INVENTOR.
BY
ATTORNEYS

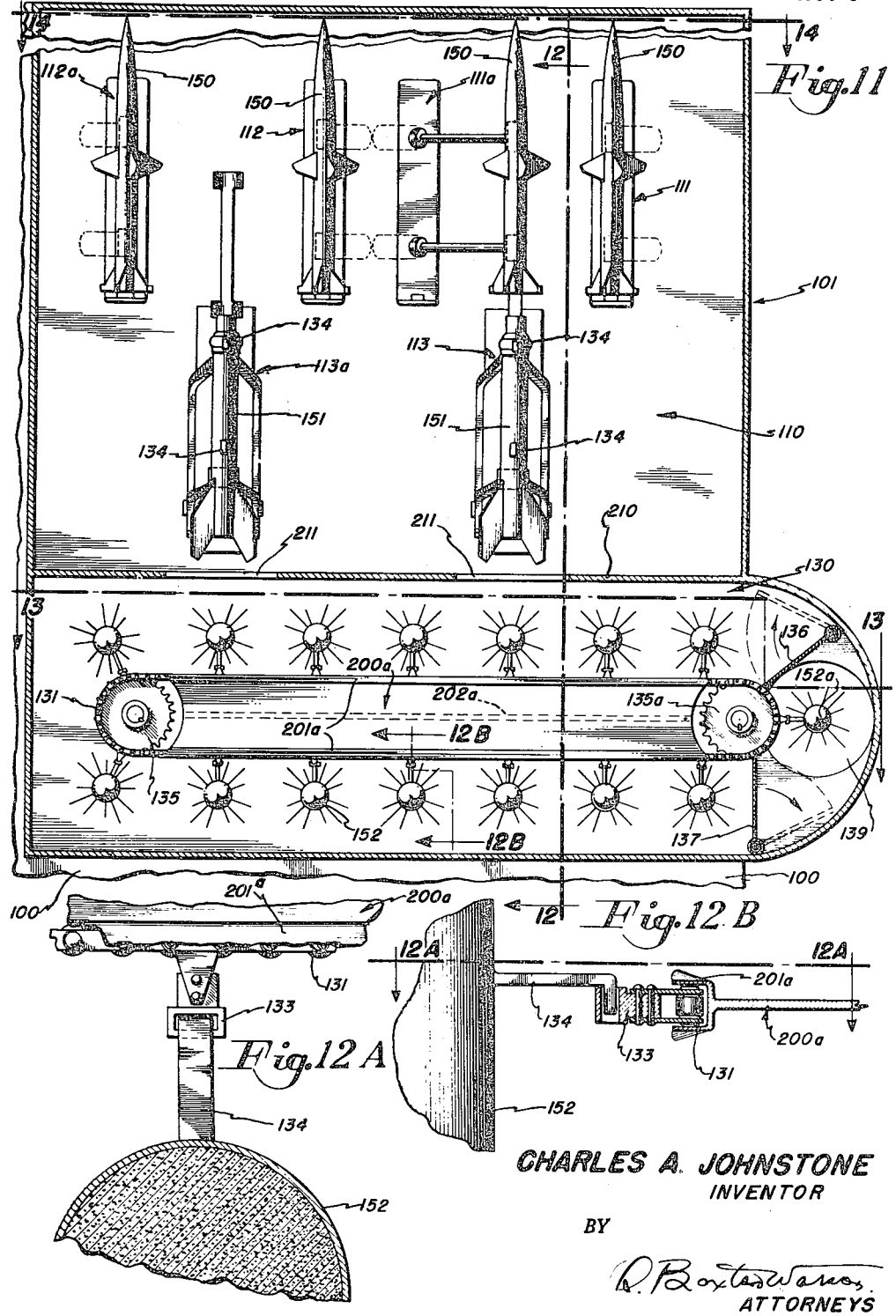

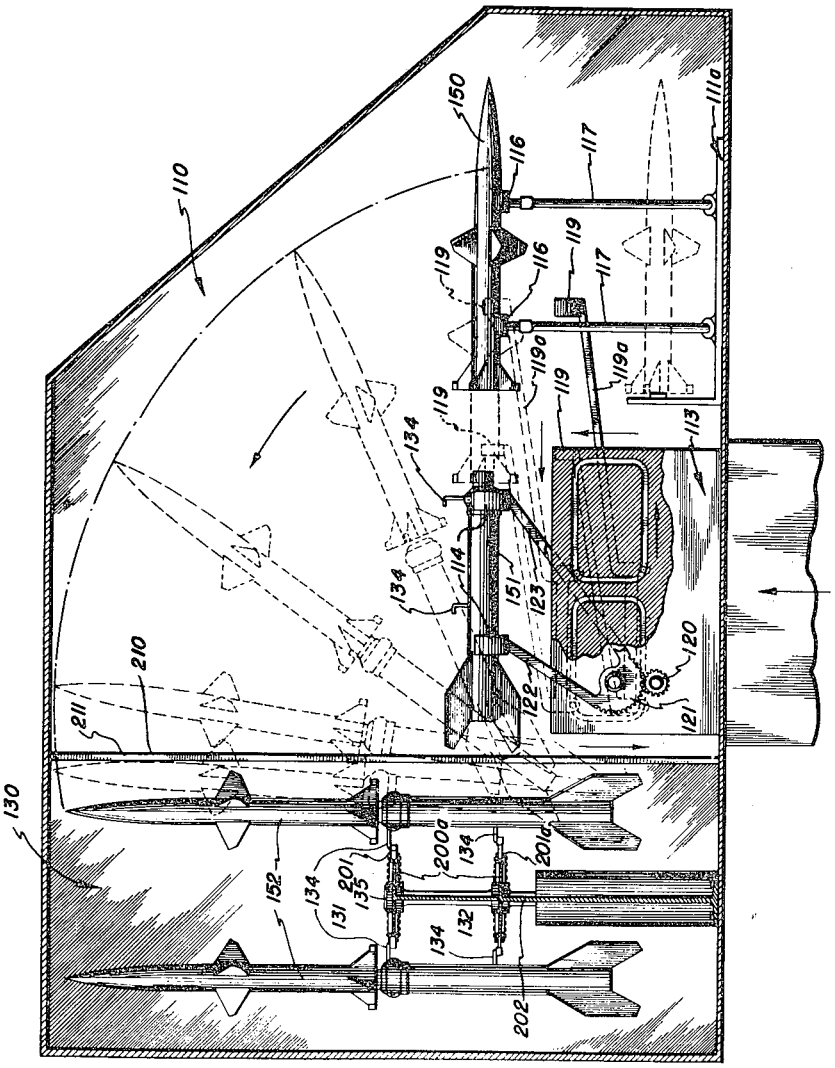

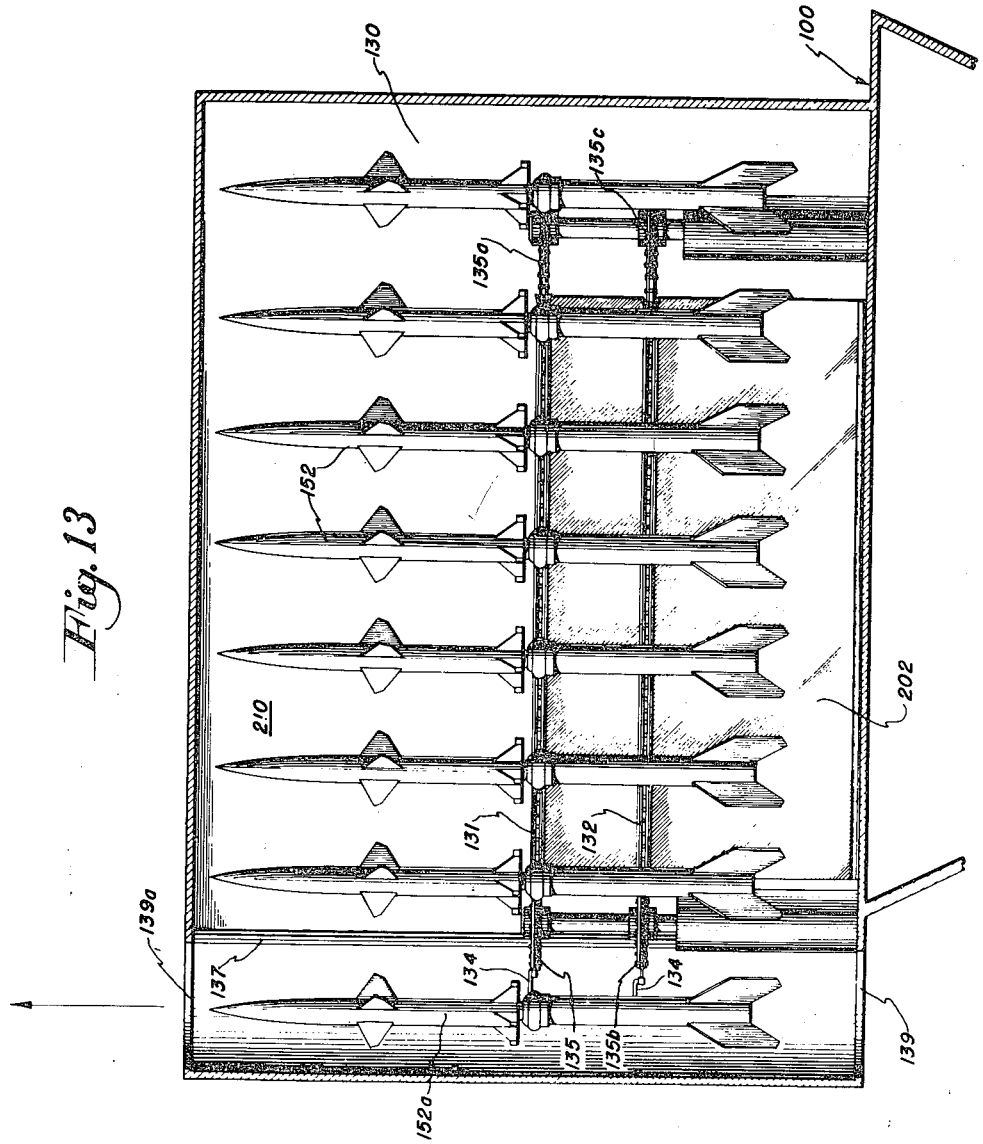

United States Patent Office 2,984,157
Patented May 16, 1961

2,984,157
MISSILE LAUNCHING SYSTEMS

Charles A. Johnstone, 1907 N. Roosevelt St., Arlington, Va.

Filed Sept. 29, 1950, Ser. No. 187,652

4 Claims. (Cl. 89—1.7)

(Granted under Title 35, U.S. Code (1952), sec. 266)

The present invention relates generally to systems for launching missiles and is most particularly adapted to the launching of guided missiles, homing missiles, and generally to that type of missile whose direction of flight or travel is determined, controlled, or affected by means other than a launching or firing barrel or the like. In addition, the present system is particularly adapted for use in conjunction with larger missiles of the type frequently employing a separable booster charge for launching; hence, in a general sense this system may be considered as particularly applicable to semifixed ammunition, and provides, in this respect, for the assembly of the missile components into an integral missile prior to launching.

In the launching of rocket or jet powered missiles or the like, the initial launching blast or firing force, which is frequently supplied by a rocket booster charge or the like in the case of jet powered missiles, results in the production of a considerable quantity of high temperature and noxious gases, which for the protection of the launching and associated equipment and operating personnel must be deflected away from the apparatus and personnel by means of a blast deflector or the like. Blast deflectors, of sufficient capacity and design as to effectively shield the area surrounding the launcher from the large quantities of heat and gas liberated by the launching charges of such missiles, greatly encumber the launching mechanism and greatly increase the stresses and strains imposed thereon as a result of the impingement of the exhaust blast gases against the deflectors. In addition to the above-mentioned disadvantages resulting from the use of blast deflectors, the necessity for providing sufficiently effective blast deflectors results in numerous problems in the design and structure thereof.

It is therefore, generally, the purpose of the present invention to provide a missile launching system which enables the launching of rocket or jet or similarly powered missiles without necessitating the use of blast deflectors. In its more general aspects, the present invention contemplates the preparation and setting of a guided or homing missile, or missile otherwise directed in its course by remote control means or by means effective to control the course of the missile after launching, the loading of a plurality of such missiles in a magazine for storage prior to firing, the feeding of the missiles contained in the magazine to a substantially fixed launching position, and the launching of the missiles in a substantially fixed direction without necessitating the use of cumbersome blast deflectors. In accordance with the present invention, in order to avoid the necessity of blast deflectors the missiles are launched from a predetermined and substantially fixed position regardless of the direction and range of the target, which position is so chosen as to direct the initial firing exhaust blast of the missile in a direction free of personnel and apparatus. Once launched from the established launching position and in the established direction, the course of the missile is directed or guided by such remote control means as a radar guiding beam in cooperation with suitable radar responsive equipment contained in the missile, or by a homing device contained within the missile, or by preset gyro compass means, or any other suitable course control means which operates to direct the course of the missile into a desired direction and for a desired range substantially independent of the initial direction imparted to the missile when launched.

It is, therefore, one object of the present invention to provide a system for launching missiles powered by rocket, jet, or similar means without necessitating the use of a blast deflector.

Another object of the present invention is to provide a missile launching system having a missile storage magazine and a feed therefor, operating to position the missiles loaded in the magazine into a substantially fixed launching position, from which the missiles are launched.

Another object of the present invention is to provide a missile launching system designed to eliminate the necessity of providing cumbersome blast deflectors, wherein the missiles are launched from a substantially fixed position and the exhaust blasts thereof are directed over the side of or away from the vehicle carrying the present system.

Another object of the present invention is to provide for the assembly of missile bird components and booster charge components, for the loading of a plurality of so assembled missiles into a magazine, for the feeding of the missiles so loaded in the magazine into a substantially fixed launching position, and the launching of the missiles from said position without necessitating the use of a blast deflector for the booster or propellant charge exhaust.

Other objects and advantages of the present invention will be apparent to those skilled in the art from a consideration of the following detailed description thereof, illustrating its application to naval warships and made in conjunction with the accompanying drawings, in which like numerals refer to like or corresponding parts and wherein:

Fig. 1 is an elevational view of a naval warship employing one embodiment of the present invention;

Fig. 2 is a top plan view of the warship shown in Fig. 1;

Fig. 3 is an enlarged top plan view of the missile launching system employed by the warship of Figs. 1 and 2 with the missile assembling and magazine loading means removed for clarity;

Fig. 4 is an enlarged detailed view, looking along the feed chain and partially in section, of a shackling means used to hold the missiles on the feeding chain, the particular shackle viewed approaching the missile launching position;

Fig. 5 is a view of the same structure as shown in Fig. 4, but looking transversely to the direction of chain travel;

Fig. 6 is a vertical cross section of the system shown in Fig. 3 taken substantially along the line 6—6 thereof, and in addition showing the means for assembling the booster charge and bird components of the missiles and loading the assembled missiles in the magazine;

Fig. 7 is a vertical section of the embodiment of the present invention shown in Fig. 3 taken substantially along the line 7—7 thereof, and in addition showing the missile assembling and magazine loading means;

Fig. 7A is a detailed frontal view of the bird supporting cradle shown in Figs. 3, 6, and 7;

Fig. 7B is a detailed frontal view of the booster supporting cradle shown in Figs. 3, 6, and 7;

Fig. 8 is a vertical section of the assembled missile magazine taken along the line 8—8 of Fig. 3;

Fig. 9 is a side elevational view of a naval warship employing a second modification of the present invention;

Fig. 10 is a top plan view of the warship shown in Fig. 9;

Fig. 11 is an enlarged top plan view of the missile launching system employed by the warship of Figs. 9 and 10;

Fig. 12 is a vertical cross section of the system shown in Fig. 11 taken along the line 12—12 thereof;

Fig. 12A is an enlarged detailed cross-sectional view taken along the line 12A—12A of Fig. 12B illustrating the missile shackling means of the feeding mechanism;

Fig. 12B is a partially sectional view of the missile shackling means, taken substantially along the line 12B—12B of Fig. 12;

Fig. 13 is a vertical section of the missile launching system shown in Fig. 11 taken along the line 13—13 thereof; and Fig. 14 is a vertical section of the embodiment of the present invention shown in Fig. 11 taken along the line 14—14 thereof.

Considering first the embodiment of the present invention illustrated in Figs. 1 through 8, Figs. 1 and 2 show the positioning of the missile launching system housings 20, 21, 22, and 23 upon a naval warship 24. The launching systems enclosed within these housings are illustrated in detail by the several views thereof shown in Figs. 3 through 8. This launching system generally comprises two portions, the missile assembly portion designated generally by the numeral 30 and the missile magazine denoted generally by the numeral 50. Each bird component 70 is united with a booster charge component 71 in the assembly portion 30 to form an assembled missile 72 which is then loaded into the missile magazine 50 and positioned upon a suitable feeding mechanism, shown in the drawings as two endless chains 51 and 52 carried by the sprockets, 55, 55a, 55b, 55c and 55d, by which the missiles are fed into the fixed launching position as occupied by the missile 72a over the launching door 53. When a missile is brought into the position of missile 72a, it is dropped from the feeding chains 51 and 52 through the door 53, whereupon the booster charge of the free missile is ignited by any suitable means to impel the missile forward in its established direction as illustrated for the several systems shown in operative position on a warship in Figs. 1 and 2.

Contained within the assembly portion 30 of the launching system housing are two booster hoists 31 and four bird component hoists 32, 32a, 33, and 33a, as shown in Fig. 3. In assembling a missile to be positioned upon the feeding mechanism of the magazine 50, the booster charge component 71 thereof is mounted upon a booster cradle 34 carried by the pistons 35 and 36 of the booster hoist 31, which may be hydraulically or otherwise operated to elevate the booster charge 71 into assembling position as shown in Fig. 6. In the meanwhile, a bird component 70 is mounted upon a bird component cradle 37 carried by the pistons 38 and 39 of one of the bird component hoists, which may be hydraulically or otherwise actuated to angularly elevate the prepared bird component 70 into axial alignment with the elevated booster charge. A missile assembling and magazine loading mechanism generally indicated by the numeral 40 is also shown in Fig. 6, which operates to drive the booster charge 71 into assembly with the bird components 70 by forcing the nose projection 47 on the booster charge into a suitable receptacle therefor in the rear end of the bird component, and then to drive the assembled missile into the missile magazine 50 and to position the assembled missile upon the chains 51 and 52 of the magazine feeding mechanism. The missile assembling and magazine loading mechanism comprises the drive block 41 and the guide beam 44 therefor. The guide beam 44 is a wedge shaped I-beam providing the T-rail 45 engaged by T-slot 46 formed on the upper surface of the drive block 41 to guide the drive block reciprocally along the beam 44. In addition, a T-slot 42 is formed in the bottom surface of the drive block 41 which cooperates with the T-shaped lugs 43 formed on the booster charge casing to guide and drive the booster charge into assembly with the bird component aligned therewith, and to drive the missile so assembled into the magazine housing 50 and onto the magazine feeding mechanism chains 51 and 52. As the drive block 41 is caused to move along the guide beam 44 from its starting position, as shown in Fig. 4, toward the magazine 50 by any suitable means such as a hydraulic ram, the T-shaped lugs 43 on the booster charge 71 enter the T-slot 42 formed in the bottom surface of the drive block 41 until the rear lug abuts the end 42a of the slot 42, whereupon continued forward movement of the drive block 41 carries the booster charge 71 against the rear end of the bird component 70, causing the nose projection 47 thereof to enter a suitable receptacle in the rear end of the bird component to hold these two components together as an assembled missile, and continued forward movement of the drive block 41 into the magazine portion 50 drives the assembled missile into the magazine, causing the assembled missile to be positioned upon the chains 51 and 52 of the magazine feeding mechanism; whereupon, the drive block 41 is withdrawn to its starting position as shown in Fig. 6, leaving the missile 72 loaded in the magazine 50.

As illustrated in the drawings (Figs. 3 and 7), the assembly portion 30 of the present system is provided with two booster component hoists 31, four bird component hoists 32, 32a, 33, and 33a, and with two missile assembling and magazine loading mechanisms 40 and 40a, one mechanism 40 being located overhead between the pair of bird component hoists 33, and 33a and the other mechanism 40a being located overhead between the pair of bird component hoists 32 and 32a. It is contemplated by the present invention that the bird component hoists of each pair will operate alternately with each other, as for example, first a bird component on hoist 32 will be angularly elevated into alignment with its corresponding loading mechanism 40a, while a bird component is mounted and prepared on hoist 32a, and upon the loading of the missile containing the bird component from the hoist 32, the hoist 32a will angularly elevate a bird component positioned and prepared thereon into alignment with said loading mechanism for assembly with a booster charge and for loading in the magazine, the hoist 32 being meanwhile loaded with a second bird component, etc. The pair of bird component hoists 33 and 33a cooperate similarly with their assembling and loading mechanism 40.

Any suitable shackling means may be employed to hold the assembled missiles on the feeding mechanism chains 51 and 52, one suitable means therefor being shown in Figs. 4 and 5. In accordance therewith, the endless chains 51 and 52 are provided at each rocket loading position with a lug catch assembly, generally indicated by the numeral 56 permanently affixed thereto while the booster charge component 71 of each missile 72 is provided with two catch engaging lugs 54, each cooperating with one of a corresponding pair of catches 56 positioned on each of the chains 51 and 52. Each catch 56 comprises a four sided main body member 58 affixed to the missile feeding chain, a spring hinged latch door 59 extending over a portion of one of the open faces of the main body member 58, a spring hinged catch release door 61 extending over the second open face formed by the main body member 58, and a locking bolt 63 spring hinged to the main body member 58 for holding the catch release door closed until the missile has reached the launching position in the magazine 50. As an assembled missile is driven into the magazine 50 by the driving block 41, the lugs 54 enter into the catches 56, as shown in Figs. 4 and 5. The detent 54a formed on the lug 54 pushes the latch door 59 inwardly into the catch chamber against the compression of its spring hinge 60 until the detent 54a clears the latch door 59, whereupon its spring hinge 60 forces the latch door 59 into the position shown in Fig. 4. Because of the abutment of the hinged end of latch door 59 with the main body portion 58 of the catch 56, the lug 54 is locked against retraction from the catch chamber, thus holding the missile as mounted upon the chains 51 and 52. In addition, the weight of the missile 72 is prevented from opening the catch release door 61 by means of the spring hinged locking bolt 63 hinged to the main body portion 58. As the missile 72 approaches the launching position, that occupied by the missile 72a (see Fig. 8), the locking bolt is tripped by abutment of its hinged end with the tripping rod 65 extending inwardly from the side of the magazine housing sufficiently to so engage and trip the locking bolt 63. Upon this occurrence the catch release door 61 is forced open against the compression of its spring hinge 62 by the weight of the missile 72a, enabling the lug 54 to fall from the catch 56 and permitting the missile to drop through the launching door 53; whereupon, the missile is fired. If the spring of hinge 62 is made sufficiently stronger than the spring of hinge 64, after the missile has been so launched the catch release door 61 and the locking bolt 63 return by the action of their springs to locked position, the wedge shape of the locking end of bolt 63 insuring that the catch release door 61 forces the bolt 63 aside as it closes, and upon closing the action of the spring hinge 64 snaps the locking bolt 63 over the catch release door 61 to hold the same in closed position.

In order that the forward lugs 54 on the booster charge components of the missiles may clear the catches 56 on chain 52, the rear lugs 54 are made to extend a farther distance from the body of the booster charge components of the missiles than the forward lugs, while the catches 56 positioned on the chain 52 are formed to extend therefrom a lesser disance than those catches positioned on the chain 51, thus enabling the forward lugs 54 to clear the lug catches 56 positioned on the chain 52 and to engage the lug catches 56 positioned on the chain 51, while the rear lugs 54 engage the catches 56 positioned on the chain 52.

As is apparent from the foregoing, provision must be made in cradles 34 and 37 to accommodate the depending lugs 54 and to enable their forward movement through these cradles as the boosters and assembled missiles are driven into the magazine. Such provision is best illustrated in Figs. 7A and 7B. Fig. 7B shows the booster cradle 34 and the longitudinal channel 205 formed therein housing the lugs 54. This channel is closed at the rear end of the cradle, but is open at the forward end to enable the booster 71 to be slid therealong and off the front end. Fig. 7A is a detailed view of the bird cradle 37, showing the longitudinal channel 206 formed therein, and is continuous therethrough and open a both ends to enable the lugs 54 to be slid therethrough during the loading of missiles into the magazine. Also, the arbor portion 207 of this cradle is provided with a slot 208 extending forwardly from about the mid-point thereof to receive the bird fin 209, aiding in balancing the bird component 70 on the cradle. This latter slot is open at the forward end of the cradle to permit the bird to be slid forwardly off the cradle during the magazine loading operation.

As previously indicated, the missile magazine comprises a housing in which are positioned two endless chains 51 and 52 carried at each of their ends by the sprockets 55, 55a, 55b, 55c, and 55d, and the assembled missiles are loaded and positioned on the chains 51 and 52 by a means such as that afore-described. To load these magazine feeding chains, each pair of lug catches 56 is successively brought into alignment with one or the other of the two magazine loading mechanisms 40 by the chain driving motor 200, whereupon a missile is loaded into the magazine and positioned upon its feeding mechanism in the manner afore-described. With the feeding chains appropriately loaded with the desired number of missiles, any number of loaded missiles may be fired at a chosen rate. To this end the missiles are successively advanced into launching position, over the missile launching door 53 formed in the bottom of the magazine 50 at one end thereof, through rotation of the sprocket wheels 55, 55a, 55b, 55c and 55d by motor 200. As each missile passes over the launching door 53 its pair of lug catches 56 are released by such trip means as rod 65, permitting the missile to drop through the launching door and outside of the magazine housing. Any suitable means, as are well known in the art, may be provided to initiate the firing of the missile and/or its booster charge in time delayed relationship to its release from the lug engaging catches 56 so as to fire the missile and/or booster charge after the missile has dropped through the launching door 53 and clear of the magazine housing. As indicated in Figs. 1, 2, 3, and 8, the launching door 53 is located over the side of the ship 24; therefore, when the missile is fired it is clear of the ship and no deleterious effects will be had from the exhaust blast gases, thereby eliminating the necessity of providing cumbersome blast deflectors as are usually necessary for firing rocket, jet, and similarly propelled missiles. As a safety precaution to protect the ship from the missile as it takes off in a course substantially parallel to the hull thereof, each missile may be turned a small amount, as shown in Figs. 3 and 8, to direct the initial flight of the missile away from the hull of the ship. This may be accomplished in any suitable manner as will be apparent to one skilled in the art, as for example by shortening the transverse travel distance along the chain 52 as compared with that along the chain 51, yet maintaining the two chains 51 and 52 at the same overall length by such means as the double sprocket wheels 55b and 55c at the launching end of chain 52, as shown in Fig. 8.

If desired, the magazine 50 may be substantially divided by the shelf 201 intermediate the upper and lower feeding chain levels, having a suitable aperture 202 formed at one end of the chains to permit the passage of the chains and the missiles therethrough. One purpose of this shelf is to facilitate the mounting of motor 200 and the sprockets 55, 55a, 55b, 55c, and 55d, and to enable the provision of suitable intermediate chain supports to prevent undue sagging thereof under the weight of the loaded missiles as indicated schematically by supports 204.

As is apparent from the foregoing description of one embodiment of the present invention, it contemplates that the missiles be launched from a fixed position to establish a determined direction of exhaust blast gases, the position being so chosen as to insure against any deleterious effects therefrom, and in the instant case, this direction being substantially parallel to the hull of the ship and located over its side. Therefore, in order to fire upon a desired target, provision must be made for controlling the flight of the missile after it has been launched. Consequently, it is further contemplated that the missiles employed in the present launching system be of the guided or homing type, or generally of such a type whose direction and range of flight may be controlled subsequent to its launching. As one possible method of control, a guided missile may be employed and controlled in its initial or booster stage of flight by a relatively short range wide angle radar beam, functioning to direct the fired missile during its initial stages of flight into a relatively long range narrow angle radar beam, in turn operating to direct the missile during the major portion of its flight to the desired target.

Figs. 9 through 14 illustrate a second embodiment of the present invention, providing for substantially vertical launching of the missiles rather than the substantially horizontal launching thereof as in the above-described embodiment. Figs. 9 and 10 show a naval warship 100 adapted to employ the present modification and illustrate the positioning of the launching system housings 101, 102, 103, and 104 thereon. These housings, as in the above-described embodiment comprise two portions, the missile assembly portion 110, where the bird components 150 and booster charge components 151 are assembled to form a unitary missile 152, and the magazine portion 130, in which the assembled missiles are loaded upon the magazine feeding chains 131 and 132, designed to feed the rockets thus loaded in the magazine one by one into the fixed missile launching position as indicated by the missile 152a located between the top and bottom missile launching openings 133a and 133, respectively. The assembly and magazine portions of these housings may be separated by suitable partition walls 210 having missile loading doorways 211 therethrough. The present modification, as the preceding one, providing for a substantially fixed launching position of missiles, also contemplates the employment of such missiles as are guided or directed in their course of flight after they have been launched.

In order to facilitate a vertical loading of missiles in the magazine 130 to provide for vertical launching thereof, the assembling and loading portion 110 of each launching system housing contains two booster hoists 113 and 113a and two pairs of bird component hoists 111 and 111a, and 112 and 112a, each pair of said bird component hoists cooperating with one of the booster hoists to alternately elevate a bird component into alignment with an elevated booster charge component in the same sequence as described for the first embodiment, and in addition means are provided on the booster component hoist to unite and assemble the two missile components, to pivot the assembled missile into a vertical position, and to load the same upon the magazine feeding chains 131 and 132 in a vertically disposed position.

Referring particularly to Fig. 12, a booster component hoist table 113 has a booster component 151 positioned on the component supporting and clamping arbors 114 and is then elevated into the missile assembling position there shown. Also, one of the bird component hoists 111a has a bird component 150 positioned and prepared on its component supporting arbors 116, and this bird component is angularly elevated by means of the elevating pistons 117 into axial alignment with the elevated booster charge component 151. The booster charge hoist table 113 has two sets of gripping fingers 119 which engage the elevated bird component 150 when the same has been placed in alignment with the booster charge component 151, whereupon the elevating pistons 117 and their attached component supporting arbors 116 are retracted to lower level position. The two sets of gripping fingers 119 are then caused to laterally traverse the booster charge hoist table 113 to assemble the two components 150 and 151 into a unitary missile 152. Upon the assembly of a missile, the power actuated gear 120 drives the gear segment 121 carrying the booster charge arbor supporting struts 122 and 123 to rotate the assembled missile into a vertical position, and thus swing the missile over from the assembly and loading portion 110 of the system's housings into the magazine portion 130, thereby loading the same in vertical position on the magazine feeding chains 131 and 132; whereupon, the clamping arbors 114 release the missile 151 and are returned to the missiles assembling position shown in Fig. 10. The booster charge hoist is then lowered, another booster charge 151 is clamped in the booster charge arbors 114, and the booster charge is then elevated into assembling position in readiness for assembly with another bird component as aligned therewith by the other of the cooperating bird component hoists.

As shown in Fig. 12, the bird gripping fingers 119 and their struts 119a are operated from suitable means provided in the booster hoist table 113 to travel a substantially rectangular path in the vertical plane. When the booster charge is elevated and during elevation of the bird component, the fingers 119 are in their lower left position of travel, as indicated by the partially solid line representation, to permit clearance thereof by the bird. When the bird has been fully hoisted, the fingers 119 are moved to the lower right extent of their travel and then upwardly to the upper right extent of their travel, thus engaging the bird with one set of fingers behind each bird hoist arbor. The bird hoist is then retracted and the fingers 119 are moved to the left extent of their travel to assemble the bird and booster components. The action of the struts 122 in pivoting the assembled missiles lifts the bird free from the fingers 119, and the fingers are then lowered to the lower left extent of their travel in readiness for the next cycle of operation.

The assembled missiles loaded on the magazine feeding chains 131 and 132 may be shackled thereto in any convenient desired manner. One possible method of shackling the missiles thereto comprises affixing eyes 133 (Fig. 12A) to each of the chains 131 and 132, one on each chain at each missile loading position, and providing each booster charge component 151 with a corresponding pair of projecting hooks 134, each designed to enter its corresponding eye 133 as the missile is positioned in the magazine 130. The sprockets 135, 135a, 135b, and 135c carry and drive the endless chains 131 and 132, thus enabling the missiles loaded in the magazine 130 to be successively fed one by one into the launching position as occupied by the missile 152a, from which substantially fixed launching position the missile is fired by any conventional means, as are well known in the art, and the missile takes off through the upper launching opening 139a formed in the magazine housing as its exhaust blast gases are directed outwardly through the bottom launching opening 139a formed in the magazine housing. If desired, suitable horizontal chain supporting plates 200 and chain guide slots 201 may be provided, carried by the vertical wall 202. Since the missiles are launched in an upward direction, they automatically free themselves from the shackling eyes 133 on the chains 131 and 132. Thus, if the shackling eyes 133 on the upper chain 131 are formed to extend from this chain a lesser distance than the shackling eyes 133 on the lower chain 132, and if correspondingly, the forward shackling hook 134 on the booster charge component casing is formed to extend from the casing a greater distance than the rear shackling hook 134 thereon, launching of the rocket from the magazine will be had without any interference from the shackling means. As shown in Figs. 7, 8, and 11, the launching position in the magazine portion 130 is located over the side of the ship 100 and further is so positioned as in the preceding embodiment to direct the exhaust blast of the propellant fuel of the missile over the side of the ship in a direction free from personnel and apparatus, this being made feasible by providing for a substantially fixed position for and direction of launching, thus eliminating the necessity of providing cumbersome exhaust blast deflectors.

Since in the present embodiment the exhaust end of the missile passes through the missile magazine, it is desirable to substantially circumscribe the launching position with blast shielding doors 137 and 136 to protect the remaining missiles in the magazine from direct exposure to the exhaust blast of the fired missiles as they pass up through the magazine and out through the launching opening 139a in the top of the magazine housing. These doors 137 and 136 are appropriately formed to avoid interference with the feeding chains 131 and 132, and are preferably vertically mounted on the magazine housing by means of spring hinges or the like so as to yield to the advancing missiles, door 137 yielding into the missile launching area in response to a missile being advanced therein and springing back to shielding position after the missile has entered into the launching position, door 136 yielding outwardly from the launching area upon the advance of a dud missile which has been positioned in the launching area and failed to fire, and springing back into shielding position after the dud missile has cleared it and before the next missile has reached the launching position.

Since the present embodiment is designed to launch missiles from an established and substantially fixed position and in an established direction, it contemplates as in the preceding embodiment the employment of missiles which may be guided in flight after being launched, and the same or a similar type of missile and method of guiding may be employed in the present system as suggested in the description of the first embodiment.

Thus, in accordance with the two embodiments described in detail hereinabove, the present invention contemplates the assembly of a missile by the union of a bird component with a booster charge component, the loading of missiles so assembled in a magazine, the controlled feeding of missiles so loaded into an established and substantially fixed launching position, the launching of missiles so fed into the launching position in an established direction, and the controlling of the course of the missile after being launched. The provision of a substantially fixed and established launching position and direction for missiles propelled by rocket, jet, or similar means enables this position to be so chosen as to provide an innocuous direction of exhaust blast as the missiles take off, thereby eliminating the necessity of providing cumbersome exhaust blast deflectors and eliminating the structural and mechanical problems involved in providing them. Also, the provisions of the present invention enable a substantially complete inclosure of the missile magazine, thereby protecting the missiles from weather condition and exposure. Although herein described in its application to the use of a compound bird and booster missile, it is apparent that the teachings of both above-described embodiments of the present invention are equally applicable to single element missiles, as for example, that type of missile usually classified as a rocket; and further, it is apparent that the present invention is applicable to aerial missiles, water missiles, such as torpedoes, and combined aerial and water missiles, such as those which are delivered to a target area by air and then continue their attack upon the target by water in torpedo fashion. The two above-described specific embodiments of the present invention are presented merely by way of example, and it is not intended to limit the scope of the present invention to the specific operative details there described, but modifications of these embodiments within the spirit and scope of the present invention as defined by the appended claims will be apparent to those skilled in the art and are within the monopoly embraced by the present patent.

The invention described herein may be manufactured and used by or for the Government of the United States of America for governmental purposes without the payment of any royalties thereon or therefor.

What is claimed is:

1. A missile launching system for semifixed ammunition comprising a missile storage chamber, a continuously movable, constant-speed missile feeding means housed by said storage chamber, said storage chamber having a portion thereof extending laterally outboard of the vehicle, said outboard portion having a fixed missile launching port formed therein, means for moving missile components together into assembled position and further moving them in the same continuous motion in spaced relation with one another onto said continuously movable feeding means in said storage chamber, latch means for removably securing assembled missiles to said feeding means, means for continuously driving said feeding means to successively bring missiles loaded thereon into a launching position outboard of the vehicle and in spaced relationship with said launching port, and means for releasing missiles thus positioned from said feeding means enabling said missiles to egress from said chamber through said launching port, thereby providing for the assembly and loading of missiles and the launching thereof from a fixed position and in a fixed orientation directly from the missile feeding means.

2. A missile launching system carried by a vehicle and comprising means for assembling and loading missiles of the semifixed type and having loading hooks longitudinally spaced thereon, said means including hoist means for positioning the components of the missile in longitudinal alignment with one another, a driving block for sequentially moving one component off said hoist means individual thereto, then into longitudinal connected relation with another component and finally moving both components as a unit to a loaded position; a continuously movable, constant-speed missile feeding means having a plurality of groups of releasable hook receiving members carried thereby, said members of each group being transversely spaced relative to one another to correspond to the spacing between the hooks on the missile, said groups of hook receiving members being longitudinally spaced along the length of said feeding means, said hooks being receivable and rigidly secured within said hook receiving members when said driving block reaches the end of its travel, a housing partially enclosing said feeding means and defining a launching port beneath the feeding means and outboard of the vehicle, and means operable in response to a missile reaching a position above the launching port to release the hooks on the missile from the hook receiving means carried by the feeding means to thereby launch the missile by gravity through the launching port.

3. A missile launching system carried by a vehicle for assembling and loading missiles of the two component type comprising a missile storage chamber having a portion thereof extending outboard of the vehicle, said outboard portion having a fixed missile launching port formed therein, a continuously movable constant speed missile feeding means housed by said missile storage chamber, a portion of the path of said feeding means traversing said launching port, means for moving the missile components together into assembled position and further moving them in the same continuous motion onto said missile feeding means, a plurality of means carried in spaced relationship relative to one another by said feeding means for receiving and releasably retaining the missiles as the latter are assembled and transferred, and means for driving said missile feeding means to bring missiles loaded thereon successively into the launching position outboard of the vehicle and in spaced relationship with said launching port.

4. The missile launching system defined in claim 3 including trip means disposed adjacent said launching port for engaging said releasable retaining means on said feeding means as each missile reaches its launching position to thereby automatically release and launch the missiles through the port.

References Cited in the file of this patent

UNITED STATES PATENTS

| | | |
|---|---|---|
| 789,355 | Chilsholm | May 9, 1905 |
| 941,662 | Smith | Nov. 30, 1909 |
| 2,342,022 | Trimbach | Feb. 15, 1944 |
| 2,380,024 | Chandler | July 10, 1945 |
| 2,381,332 | Boldt | Aug. 7, 1945 |
| 2,447,315 | Clarke | Aug. 17, 1948 |
| 2,451,745 | Jolly | Oct. 19, 1948 |
| 2,517,333 | Motley | Aug. 1, 1950 |
| 2,546,823 | Holloway | Mar. 27, 1951 |
| 2,585,030 | Nosker | Feb. 12, 1952 |

FOREIGN PATENTS

| | | |
|---|---|---|
| 171,502 | Germany | June 5, 1906 |
| 311,664 | Italy | Oct. 7, 1933 |
| 380,352 | Italy | May 8, 1940 |
| 561,646 | Great Britain | May 30, 1944 |
| 411,576 | Italy | Jan. 18, 1945 |
| 579,310 | Great Britain | May 8, 1946 |